US010162279B2

(12) United States Patent
Qiu et al.

(10) Patent No.: US 10,162,279 B2
(45) Date of Patent: Dec. 25, 2018

(54) SOLVENT FREE EMULSIFICATION PROCESSES

(71) Applicant: XEROX CORPORATION, Norwalk, CT (US)

(72) Inventors: Shigang Qiu, Toronto (CA); Kathryne S. Brockman, Mississauga (CA); Michael J. D'Amato, Thornhill (CA); Frank Ping Hay Lee, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 151 days.

(21) Appl. No.: 15/224,367

(22) Filed: Jul. 29, 2016

(65) Prior Publication Data

US 2018/0031987 A1 Feb. 1, 2018

(51) Int. Cl.

*C08J 3/00* (2006.01)
*G03G 9/08* (2006.01)
*G03G 9/087* (2006.01)

(52) U.S. Cl.

CPC .......... *G03G 9/081* (2013.01); *G03G 9/0804* (2013.01); *G03G 9/0812* (2013.01); *G03G 9/0825* (2013.01); *G03G 9/08755* (2013.01)

(58) Field of Classification Search

CPC .......... C08J 3/00; G03G 9/081; G03G 9/0825
See application file for complete search history.

(56) References Cited

U.S. PATENT DOCUMENTS

| | | | |
|---|---|---|---|
| 5,290,654 | A | 3/1994 | Sacripante et al. |
| 5,302,486 | A | 4/1994 | Patel et al. |
| 5,346,797 | A | 9/1994 | Kmiecik-Lawrynowicz et al. |
| 5,364,729 | A | 11/1994 | Kmiecik-Lawrynowicz et al. |
| 5,403,693 | A | 4/1995 | Patel et al. |
| 5,418,108 | A | 5/1995 | Kmiecik-Lawrynowicz et al. |
| 5,501,935 | A | 3/1996 | Patel et al. |
| 5,527,658 | A | 6/1996 | Hopper et al. |
| 5,585,215 | A | 12/1996 | Ong et al. |
| 5,650,255 | A | 7/1997 | Ng et al. |
| 5,853,943 | A | 12/1998 | Cheng et al. |
| 6,593,049 | B1 | 7/2003 | Veregin et al. |
| 6,756,176 | B2 | 6/2004 | Stegamat et al. |
| 6,830,860 | B2 | 12/2004 | Sacripante et al. |
| 7,989,135 | B2 | 8/2011 | Zhou et al. |
| 8,192,913 | B2 | 6/2012 | Faucher et al. |
| 9,176,404 | B2 | 11/2015 | Komada |
| 9,366,979 | B2 * | 6/2016 | Li ........................ G03G 9/0819 |
| 2005/0271965 | A1 | 12/2005 | Nobumichi et al. |
| 2009/0208864 | A1 * | 8/2009 | Zhou .......................... C08J 3/05 430/137.14 |
| 2010/0266948 | A1 | 10/2010 | Lai et al. |
| 2011/0200930 | A1 | 8/2011 | Shigang et al. |
| 2012/0148951 | A1 | 6/2012 | Qiu et al. |
| 2013/0245197 | A1 | 9/2013 | Faucher et al. |
| 2014/0370434 | A1 * | 12/2014 | Qiu ......................... C08L 67/02 430/109.4 |

FOREIGN PATENT DOCUMENTS

EP 2105455 A2 9/2009

OTHER PUBLICATIONS

Extended European Search Report dated Dec. 5, 2017 in corresponding European Application No. 17182702.5.

* cited by examiner

*Primary Examiner* — Hannah J Pak
(74) *Attorney, Agent, or Firm* — MH2 Technology Law Group LLP

(57) ABSTRACT

Provided is an emulsion that includes a water phase and a resin containing phase. The emulsion is prepared from a mixture comprising water, a surfactant, a resin that includes an acidic moiety, and an organic compound having at least two different moieties. Each of the two moieties have a single functionality or dual functionality. The single functionality and the dual functionality are selected from a capability to neutralize the acidic moiety of the resin, a capability to form a hydrogen bond, or both.

9 Claims, 5 Drawing Sheets

SOLVENT FREE EMULSIFICATION PROCESSES

TECHNICAL FIELD

The present disclosure relates to processes for producing resin emulsions useful in producing toners suitable for electrostatographic apparatuses.

BACKGROUND

Numerous processes are within the purview of those skilled in the art for the preparation of toners. Emulsion aggregation (EA) is one such method. These toners may be formed by aggregating a colorant with a latex polymer formed by emulsion polymerization. For example, U.S. Pat. No. 5,853,943, the disclosure of which is hereby incorporated by reference in its entirety, is directed to a semi-continuous emulsion polymerization process for preparing a latex by first forming a seed polymer. Other examples of emulsion/aggregation/coalescing processes for the preparation of toners are illustrated in U.S. Pat. Nos. 5,403,693, 5,418,108, 5,364,729, and 5,346,797, the disclosures of each of which are hereby incorporated by reference in their entirety. Other processes are disclosed in U.S. Pat. Nos. 5,527,658, 5,585,215, 5,650,255, 5,650,256 and 5,501,935, the disclosures of each of which are hereby incorporated by reference in their entirety.

Polyester EA toners have also been prepared utilizing emulsions prepared by solvent containing processes, for example, solvent flash emulsification and solvent-based phase inversion emulsification. In both cases, large amounts of organic solvents such as ketones or alcohols have been used to dissolve the resins. The solvents need to be evaporated at the end of the emulsification, which usually takes a long time to complete. Other drawbacks with these processes include: 1) the solvent containing process is not environmentally friendly; 2) waste treatment and solvent recovery adds extra cost to the EA toner process; and 3) the residual amount of solvent may vary, which will affect both the toner process and the toner produced by the process.

Accordingly, solvent-free emulsion processes have been developed such as solvent-free extrusion emulsification (SFEE) and solvent-free phase inversion emulsification (SF-PIE). However, in such processes, crystalline polyester resin (CPE)—the key component in ultra low melt (ULM) emulsion/aggregation toner—can only be successfully emulsified using a high surfactant concentration which leads to significant difficulties with toner washing and higher triboelectric charge in the final toner. While not limited to any particular theory, it is believed that with high surfactant concentration, excess surfactant is trapped in the toner particle made with the solvent-free latex.

Additionally, rotor-stator type homogenizers have been widely used to prepare emulsions and dispersions. However, the particle size achievable with traditional rotor-stator homogenizers may not be as small as those with media mills or high-pressure homogenizers equipped with homogenizing valves or liquid jet interaction chambers.

Improved methods for producing toners, which reduce the number of stages and materials, remain desirable. Such processes may reduce production costs for such toners and may be environmentally friendly.

SUMMARY

In an embodiment there is an emulsion comprising: a water phase and a resin containing phase, wherein the emulsion is prepared from a mixture comprising water, a surfactant, a resin comprising an acidic moiety, and an organic compound comprising at least two different moieties, each of the two moieties having a single functionality or dual functionality, wherein the single functionality and the dual functionality are selected from a capability to neutralize the acidic moiety of the resin, a capability to form a hydrogen bond, or both.

In another embodiment there is a process comprising: melt mixing a mixture comprising a surfactant, a resin comprising an acidic moiety, and an organic compound; adding water to the mixture to form an emulsion; and adding additional water to the emulsion to perform a phase inversion resulting in a phase inversed emulsion. The organic compound comprises at least two different moieties, each of the two moieties having a single functionality or dual functionality, wherein the single functionality and the dual functionality are selected from a capability to neutralize the acidic moiety of the resin, a capability to form a hydrogen bond, or both. The emulsion comprises a first disperse phase and a first continuous phase, wherein the first disperse phase comprises the water and the first continuous phase comprises the resin. The phase inversed emulsion comprises a second continuous phase and a second disperse phase, wherein the second continuous phase comprises the water and the second disperse phase comprises a plurality of droplets comprising the resin.

In another embodiment, there is a process comprising: using a homogenizer to homogenize a mixture. The mixture comprises water, a surfactant, a resin comprising an acidic moiety, and an organic compound comprising at least two different moieties. Each of the two moieties have a single functionality or dual functionality. The single functionality and the dual functionality are selected from the group consisting of a capability to neutralize the acidic moiety of the resin and a capability to form a hydrogen bond. The homogenizing forms an emulsion comprising a continuous phase and a disperse phase. The mixture is not subjected to a phase inversion prior to the formation of the emulsion. The continuous phase comprises the water. The disperse phase comprises a plurality of droplets comprising the resin.

Additional advantages of the embodiments will be set forth in part in the description which follows, and in part will be understood from the description, or may be learned by practice of the embodiments. The advantages will be realized and attained by means of the elements and combinations particularly pointed out in the appended claims.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this specification, illustrate embodiments of the present teachings and together with the description, serve to explain the principles of the disclosure.

DESCRIPTION OF THE EMBODIMENTS

Figure 1:
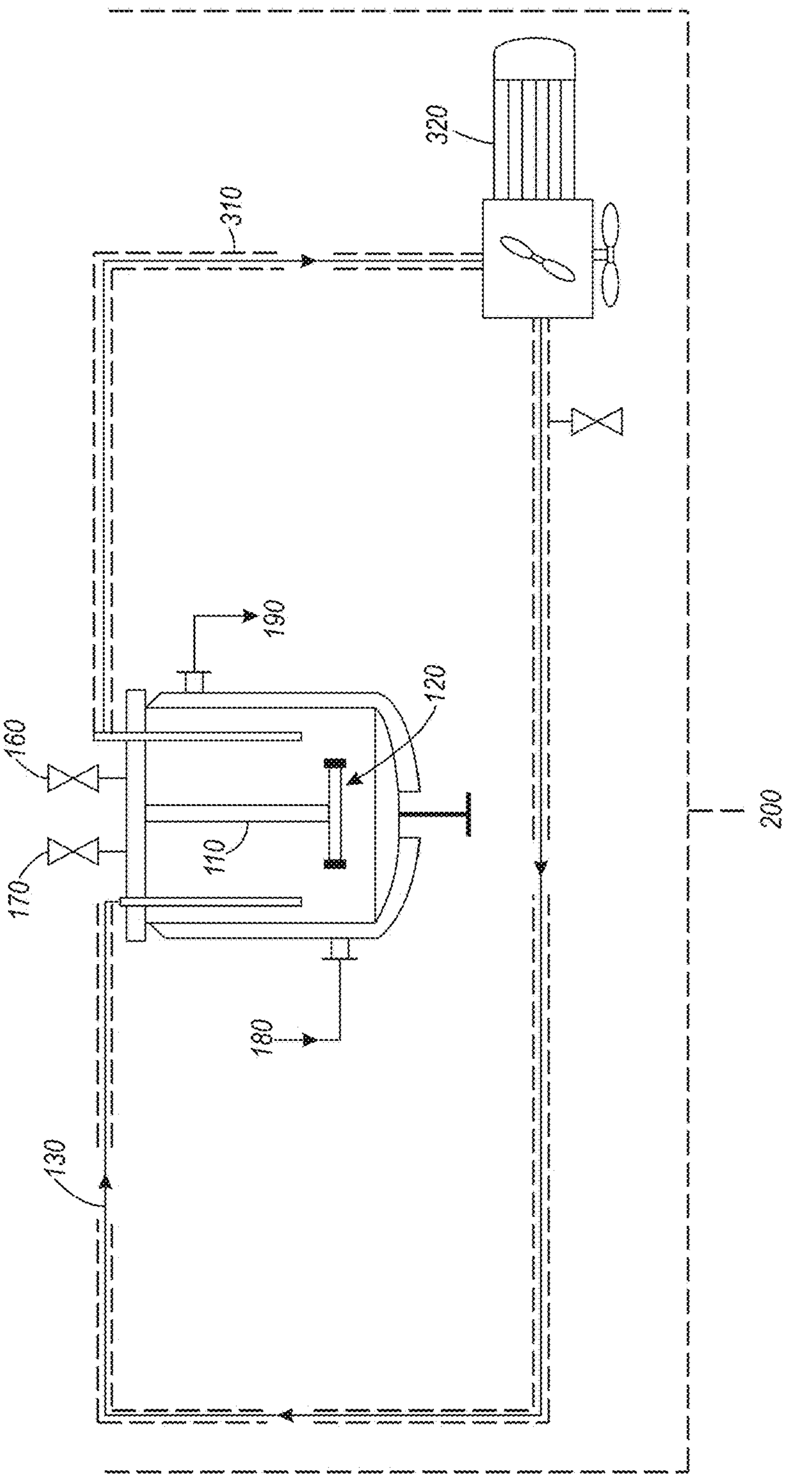
FIG. 1 is a schematic drawing of an exemplary embodiment of a dispersion apparatus as disclosed herein to allow for a latex dispersion in a homogenization process.

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present embodiments. It is intended that the specification and examples be considered as examples only. The various embodiments are not necessarily mutually exclusive, as some embodiments can be combined with one or more other embodiments to form new embodiments.

As used herein, "the absence of an organic solvent" means that organic solvents are not used to dissolve the polyester resin for emulsification. However, it is understood that minor amounts of such solvents may be present in such resins as a consequence of their use in the process of forming the resin.

Emulsion Aggregation (EA) toner particles may be prepared by a process of controlled aggregation of finely divided and stabilized toner components such as polymer resins, pigments, waxes, and/or silica. Current EA toner processes may involve mixing of resin latexes, wax dispersions, and pigment dispersions, followed by homogenizing the resulting mixture while adding a metal ion coagulant to form aggregated toner particles with the desired particle size, terminating the growth of toner particles by adjusting the slurry pH, and finally coalescing the toner particles to the desired shape.

In an embodiment, the present disclosure provides resin emulsions which may be utilized to make toners, and processes for producing resin emulsions and toners. The emulsion may comprise a water phase and a resin containing phase. Generally, the emulsion can be prepared from a mixture comprising water, a surfactant, a resin comprising an acidic moiety, and an organic compound comprising at least two different moieties. Each of the two moieties may have a single functionality or may have dual functionality. In an embodiment, the single functionality and the dual functionality are selected from the group consisting of a capability to neutralize the acidic moiety (i.e., functions as a base) of the resin, a capability to form a hydrogen bond (i.e. functions as an emulsifier), or both. The emulsion may be free of an organic solvent. The at least two different moieties may be a hydroxyl group, a nitrogen containing moiety or mixtures thereof. The surfactant may be present in a concentration of from about 2% to about 4% by weight of the resin.

Generally, in a batch process for making a resin emulsion, the process may include melt mixing a resin with at least one surfactant, and adding at least one additional component, such as a neutralizing agent, which may function as an emulsifier, in order to form a melt composition. In an embodiment, the neutralizing agent may comprise an organic compound, for example, a organic tertiary amine such as triethanolamine. Water may be added initially or after melt mixing. The process also includes forming an emulsion of resin particles from the melt composition. The resin may be a crystalline resin, an amorphous resin or both. While not limited to any particular material, in one embodiment, the resin may comprise a crystalline polymer such as crystalline polyester. Additionally, the resin particles may have sizes in the range of nanoscale to microscale.

More specifically, a process for making a resin emulsion includes melt mixing a mixture that includes a surfactant, a resin comprising an acidic moiety, and an organic compound comprising at least two different moieties; adding water to the mixture to form an emulsion comprising a first disperse phase and a first continuous phase; and adding additional water to the emulsion to form a phase inversed emulsion comprising a second continuous phase and a second disperse phase. As described above, each of the two different moieties may have a single functionality or a dual functionality that may be selected from the group consisting of a capability to neutralize the acidic moiety of the resin, a capability to form a hydrogen bond, or both. The first disperse phase may comprise the water, the first continuous phase may comprise the resin, the second continuous phase may comprise the water and the second disperse phase may comprise a plurality of droplets comprising the resin.

In one implementation, the emulsion and the phase inversed emulsion may be free of an organic solvent. The plurality of droplets may further comprise the organic compound and the surfactant. As described in more detail below, additional steps may be taken to form a toner from the resulting emulsified latex comprising the plurality of droplets. For example, the plurality of droplets may be dried to form toner-sized resin particles which may have a unimodal particle size distribution comprising average particle sizes in a range of less than or equal to 5 μm, such as from about 70 nm to about 500 nm, including for example, from about 130 nm to about 500 nm, or from about 160 nm to about 190 nm.

In an example, the melt mixing may be in the absence of an organic solvent. The resulting melt composition may, therefore, comprise the surfactant, such as anionic surfactant, for example, dodecyl benzene sulphonate. While not necessarily limited to any particular amount, in an example, surfactant may be included in the melt composition at a surfactant level of up to about 5 pph, for example, up to about 3.5 pph based on an amount of resin.

The melt mixing can occur at an elevated temperature sufficient to melt the resin. Thus, the melt mixing can occur at a temperature greater than 40° C., such as in the range of from about 40° C. to about 130° C., for example, in the range of from about 70° C. to about 130° C., such as from about 75° C. to about 120° C., or even from about 120° C. to about 130° C.

Generally, a semi-continuous process includes providing a dispersion apparatus comprising a container and a homogenizer. The homogenizer may be coupled to the container, for example, via a recirculation device. The process may also include melt-mixing a resin, for example, in the absence of an organic solvent, with at least one neutralizing agent, at least one surfactant, and water to form a melt composition in the container; and flowing the melt composition to the homogenizer via the recirculation device to form a latex dispersion comprising resin particles sized in the nanoscale and microscale.

More specifically, such a method includes homogenizing a mixture with a homogenizer. The mixture comprises water, a surfactant, a resin comprising an acidic moiety, and an organic compound comprising at least two different moieties. Each of the two moieties has a single functionality or dual functionality. The single functionality and the dual functionality are selected from the group consisting of a capability to neutralize the acidic moiety of the resin and a capability to form a hydrogen bond. The homogenizing forms an emulsion comprising a continuous phase comprising the water and a disperse phase comprising a plurality of droplets comprising the resin. In such a method, the mixture is not subjected to a phase inversion prior to the formation of the emulsion. In an implementation, such a method may further comprise melt mixing the mixture prior to the homogenizing to form a melt composition.

Similar to that described above, the melt composition may include a surfactant level of up to about 5 pph, for example, up to about 3.5 pph, including in a range of from about 2 pph to about 3 pph, such as from about 2.5 pph to about 3 pph based on an amount of resin. The melt mixing may also be conducted in the absence of an organic solvent. While not necessarily limited to any particular organic compound, some examples include triethanolamine, ammonium hydroxide, sodium hydroxide, or mixtures thereof. Further organic compounds are described below.

As described in more detail below, additional steps may be taken to form a toner from the resulting emulsified latex comprising the plurality of droplets. For example, the plurality of droplets may be dried to form toner-sized resin particles which may have a bimodal particle size distribution comprising average particle sizes in a range of less than or equal to 5 μm, such as from about 160 nm to about 2 μm, including for example, from about 130 nm to about 200 nm.

After forming the latex emulsion according to the processes disclosed herein, some or all of the surfactant and organic compound may be removed. In an example, residual surfactant and organic compound can be removed from the resulting latex through any process known in the art, including, dialysis and ion exchange.

FIG. 1 is an illustration of an exemplary dispersion apparatus for preparing a latex dispersion as disclosed herein. In FIG. 1, a first container 110 can contain a solution that may be stirred by a stirring mechanism 120 such as, for example, a stirring blade. The first container 110 is connected to a dispersion loop via a recirculation device 130, such as, for example, at least one tube.

In certain embodiments, such as that depicted, for example in FIG. 1, the first container 110 comprises a mixer. The container 110 may also comprise a vent 160, a charge port 170, an inlet for hot glycol, hot oil, and/or steam 180, and an outlet for hot glycol, hot oil, and/or steam 190. An opening in the container 110 may be connected to dispersion loop 200 and may serve as an inlet for a first portion of the dispersion loop. The container 110 may also comprise another opening that is connected to the dispersion loop 200 and may serve as an outlet connected to a second portion of dispersion loop 200.

In certain exemplary embodiments and as shown in FIG. 1, the dispersion loop 200 may comprise a steam jacketed loop 310 as part of the recirculation device 130 connected to the container 110, and a homogenizer 320, which may be a piston homogenizer (e.g., a Gaulin® 15MR available from APV Homogenizer) which may be operated at 1500 psig or greater, including for example, about 1500 psig to about 6000 psig, such as 1500 psig to 2000 psig. An inlet to the homogenizer 320 may be connected to the first opening in the container 110 and an outlet from the homogenizer 320 may be connected to the second opening of the container 110, thereby forming a circulation loop between the container 110 and the homogenizer 320.

During operation of the dispersion apparatus, a solution comprising a resin, a neutralizing agent, a surfactant and water may be melt mixed in the first container 110 using the stirring device 120 to form a melt composition. The solution may be heated for a time sufficient to melt the resin and to form a melt composition. According to various exemplary embodiments, the melt composition may be flowed to the homogenizer 320.

After the dispersion passes through the homogenizer 320, the dispersion may be flowed back to the first container 110 via the recirculation device 130. Accordingly, the dispersion may be further stirred by the stirring device 120, and may repetitively be flowed back via the recirculation device 130 to the homogenizer 320.

According to various exemplary embodiments, a recirculation loop may be set up by having a discharge outlet in the homogenizer 320. Pipes may be connected between the discharge outlet of the homogenizer 320 and the first container 110 via recirculation device 130. The first container 110 may be connected to the homogenizer 320 in such a way that a dispersion in the homogenizer may flow to the first container 110 and back to the homogenizer in a substantially continuous manner. The recirculation of the dispersion back to the homogenizer allows the homogenizer to further reduce the size of the latex particles dispersed in the dispersion each time the dispersion is recirculated in the homogenizer until a desired latex particle size is achieved. In an example, the particles formed according to this process comprise a bimodal distribution of particle sizes, for example, with average particle sizes in a range of from about 160 nm to about 2 μm.

Resin

Any resin may be utilized in the processes of the present disclosure. Such resins, in turn, may be made of any suitable monomer or monomers via any suitable polymerization method. In embodiments, the resin may be prepared by a method other than emulsion polymerization. In further embodiments, the resin may be prepared by condensation polymerization.

In embodiments, the resin may be a polyester, polyimide, polyolefin, polyamide, polycarbonate, epoxy resin, and/or copolymers thereof. In embodiments, the resin may be an amorphous resin, a crystalline resin, and/or a mixture of crystalline and amorphous resins. The crystalline resin may be present in the mixture of crystalline and amorphous resins, for example, in an amount of from 0 to about 100 percent by weight of the total toner resin, in embodiments from 5 to about 35 percent by weight of the emulsion. The amorphous resin may be present in the mixture, for example, in an amount of from about 0 to about 100 percent by weight of the total emulsion, in embodiments from 95 to about 65 percent by weight of the emulsion. In embodiments, the resin may be a crystalline polyester and/or an amorphous polyester resin.

In embodiments, the polymer utilized to form the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, ethylene glycol, combinations thereof, and the like. The aliphatic diol may be, for example, selected in an amount of from about 40 to about 60 mole percent, in embodiments from about 42 to about 55 mole percent, in embodiments from about 45 to about 53 mole percent of the resin, although the amounts can be outside of these ranges.

Examples of organic diacids or diesters selected for the preparation of the crystalline resins include oxalic acid, succinic acid, glutaric acid, adipic acid, suberic acid, azelaic acid, fumaric acid, maleic acid, dodecanedioic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof, and combinations thereof. The organic diacid may be selected in an amount of, for example, in embodiments from about 40 to about 60 mole percent, in embodiments from about 42 to about 55 mole percent, in embodiments from about 45 to about 53 mole percent, although the amounts can be outside of these ranges.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly (butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), alkali copoly(5-sulfoisophthaloyl)-copoly(ethylene-adipate), poly (decylene-sebacate), poly(decylene-decanoate), poly-(ethylene-decanoate), poly-(ethylene-dodecanoate), poly (nonylene-sebacate), poly(nonylene-decanoate), copoly (ethylene-fumarate)-copoly(ethylene-sebacate), copoly (ethylene-fumarate)-copoly (ethyl ene-decanoate), and copoly(ethylene-fumarate)-copoly(ethylene-dodecanoate).

The crystalline resin can possess a melting point in the range of from about −20° C. to about 300° C., such as from bout 20° C. to about 150° C., for example, from about 50° C. to about 120° C., although the melting point can be outside of these ranges.

In embodiments, a pre-made resin may be utilized to form the resin emulsion.

Neutralizing Agent

In embodiments, the process of the present disclosure may include adding a neutralizing agent to a solution comprising a resin before, during, or after, melt-mixing the resin at an elevated temperature. For example, once obtained, the resin may be melt-mixed at an elevated temperature, and at least one neutralizing agent may be added thereto.

In embodiments, the neutralizing agent can neutralize acid groups in the resins. The neutralizing agent, therefore, may comprise a basic neutralizing agent. However, the neutralizing agent may comprise other functionality aside from or in addition to neutralizing the acid groups in the resins. For example, the neutralizing agent may function as an emulsifier. While not limited to any particular theory, it is believed that this emulsifier is capable of forming hydrogen bonds. Additionally, via the neutralizing of at least some of the resins' acid groups, the addition of the basic neutralizing agent may thus raise the pH of an emulsion including a resin possessing acid. The neutralizing of the acid groups may, therefore, enhance formation of the emulsion.

In an embodiment, the neutralizing agent may comprise an organic compound. The organic compound may comprise at least two different moieties, with each of the two moieties having a single functionality or dual functionality, wherein the single functionality and the dual functionality are selected from the group consisting of a capability to neutralize the acidic moiety of the resin and a capability to form a hydrogen bond. For example, the at least two moieties may comprise a hydroxyl group, a nitrogen containing moiety, or mixtures thereof.

The neutralizing agent may be a solid, liquid, or, in embodiments, added in the form of an aqueous solution. In embodiments, an aqueous neutralizing solution may include water, for example, deionized water (DIW), and at least one neutralizing agent to provide the aqueous neutralizing solution with an alkaline pH. The neutralizing agent may be present in an amount of from about 0.5% by weight to about 100% (pure basic agent) by weight of the aqueous solution, in embodiments from about 85% by weight to 100% by weight of the aqueous solution, or in embodiments from about 5% by weight to about 18% by weight of the aqueous solution.

Any suitable neutralizing agent may be used in accordance with the present disclosure. In embodiments, suitable neutralizing agents include both inorganic neutralizing agents and organic neutralizing agents, such as organic compounds comprising organoamines. Exemplary neutralizing agents include, but are not limited to, ammonia, triethanolamine, ammonium hydroxide, potassium hydroxide, sodium hydroxide, sodium carbonate, sodium bicarbonate, lithium hydroxide, potassium carbonate, triethylamine, tris (hydroxymethyl)aminomethane, tris(hydroxymethyl) propane, 2-(methylamino)-ethanol, ethanolamine, and combinations thereof.

A neutralizing ratio of from about 0.1% to about 400%, for example, from about 0.5% to about 320% may be achieved by utilizing at least one from the above neutralizing agents in combination with a resin possessing acid groups, Surfactant In embodiments, the process of the present disclosure optionally includes adding at least one surfactant before, during, or after, melt-mixing the resin at an elevated temperature. In embodiments, the at least one surfactant may be added after melt-mixing the resin at an elevated temperature. Where utilized, a resin emulsion may include one, two, or more surfactants. The surfactant(s) may be selected from ionic surfactants and nonionic surfactants. Anionic surfactants and cationic surfactants are encompassed by the term "ionic surfactants." In embodiments, the surfactant may be added as an aqueous solution with a concentration from about 0.5% to about 100% (pure surfactant) by weight, or from about 5% to about 70% by weight.

In embodiments, the surfactant may be utilized so that it is present in an amount of from about 0.5% to about 15% by weight of the resin, for example from about 1% to about 5% by weight of the resin, in embodiments from about 2% to about 4% by weight of the resin. As discussed above, surfactant may be utilized so that it is present in an amount of from less than or equal to about 5 pph, for example, less than or equal to about 3 pph, including from about 2 pph to about 33 pph, such as from about 2.5 pph to about 3 pph per 100 parts of the resin.

Examples of nonionic surfactants that can be utilized for the processes illustrated herein and that may be included in the emulsion are, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Toner

The present disclosure also provides processes for producing toner particles. For example, once the resin mixture has been contacted with water to form an emulsion, the resulting latex may then be utilized to form a toner by any method within the purview of those skilled in the art. For example, the latex emulsion may be manipulated and/or contacted with additional ingredients to form a toner by a suitable process, in embodiments, an aggregation and coalescence process in which small-size resin particles are aggregated to the appropriate toner particle size and then coalesced to achieve the final toner particle shape and morphology.

In an implementation, the solvent-free emulsified latex may be mixed with the additional ingredients to form a slurry. The slurry may be heated to a temperature of about 30° C. to about 90° C. which causes the formation of aggregates. The aggregates may then be heated at a temperature of from about 50° C. to about 105° C. to cause coalescence of the aggregates. Additional steps may include homogenizing, adjustment of the pH of the slurry, and addition of chelators as would be understood by one of ordinary skill in the art.

In embodiments, the additional ingredients of a toner composition include colorant(s), wax(es), amorphous resin(s) and other additives, may be added before, during or after melt mixing the resin to form the latex emulsion of the present disclosure. The additional ingredients may be added before, during or after formation of the latex emulsion. In further embodiments, the colorant may be added before the addition of the surfactant.

As the colorant(s) to be added, various known suitable colorants, such as dyes, pigments, mixtures of dyes, mixtures of pigments, mixtures of dyes and pigments, and the like, may be included in the toner. In embodiments, the colorant may include a pigment, a dye, combinations thereof, carbon black, magnetite, black, cyan, magenta, yellow, red, green, blue, brown, combinations thereof, in an amount sufficient to impart the desired color to the toner.

Optionally, at least one wax may also be combined with the resin and a colorant in forming toner particles. The wax may be provided in a wax dispersion, which may include a single type of wax or a mixture of two or more different waxes. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

The toner particles may be prepared by any method within the purview of one skilled in the art, for example as disclosed in U.S. Pat. No. 7,989,135, the disclosure of which is hereby incorporated by reference in its entirety. Although embodiments relating to toner particle production are described with respect to emulsion aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety.

EXAMPLES

Example 1

Figure 2:
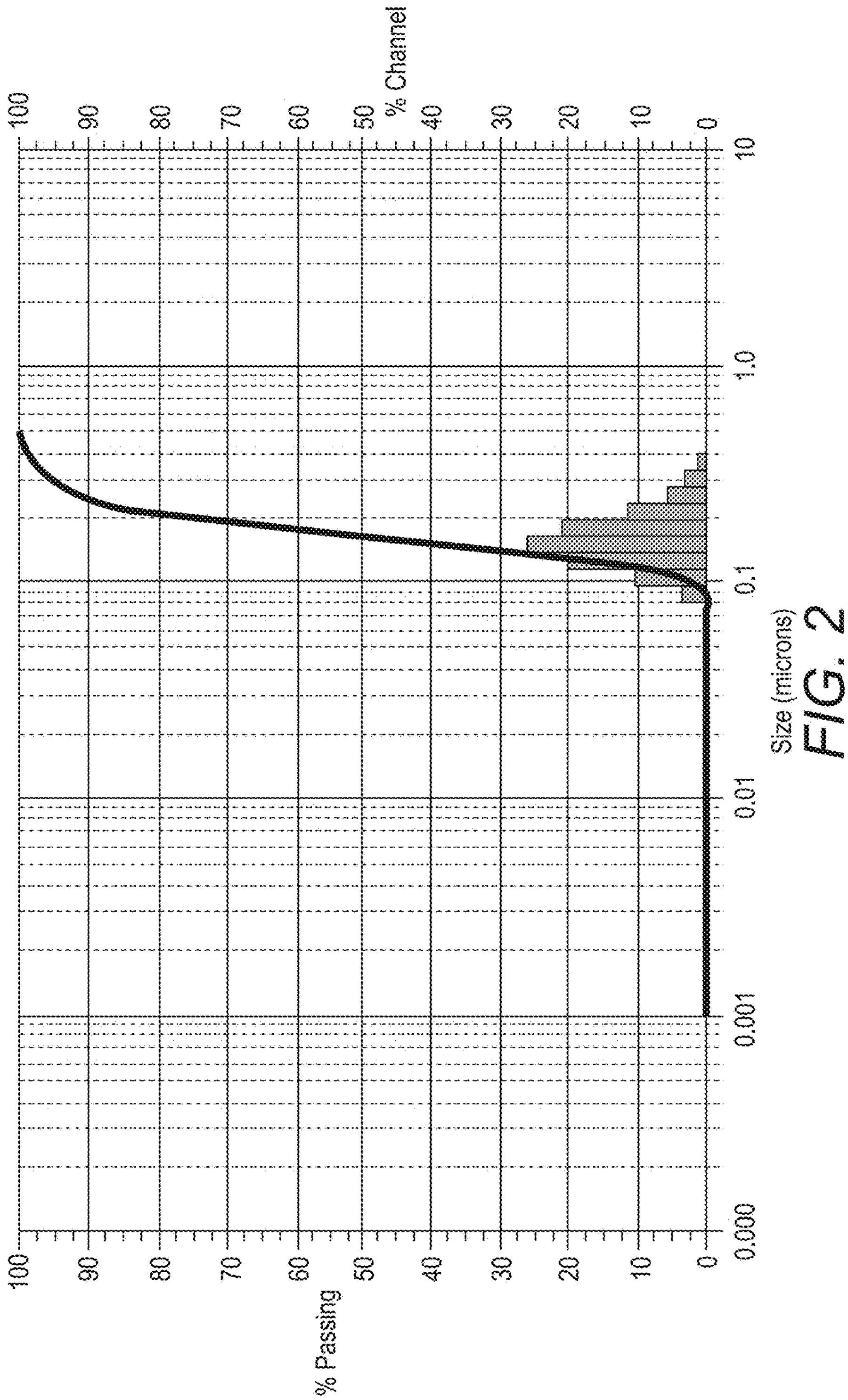
FIG. 2 is a graph depicting the particle size distribution for the latex dispersion composition produced in accordance with Example 1 of the present disclosure.

A 2 Liter Buchi reactor equipped an agitator was charged with 300 grams of crystalline polyester resin (CPE), 10.6 grams of triethanolamine (>98%, 3.45 pph), and 14.4 grams of anionic surfactant (TAYCAPOWDER BN2060, 62.5 wt %, 3.0 pph). The reactor was sealed and heated to 100° C. with a mixing speed of 500 RPM and maintained at 100° C. for 40 minutes. 705 grams of DIW was pumped into the mixture at an addition rate of 10.9 grams per minutes in 65 minutes. The emulsion obtained had a particle size of 162 nm (FIG. 2) with a solid content of 31.11%.

Example 2

Figure 3:
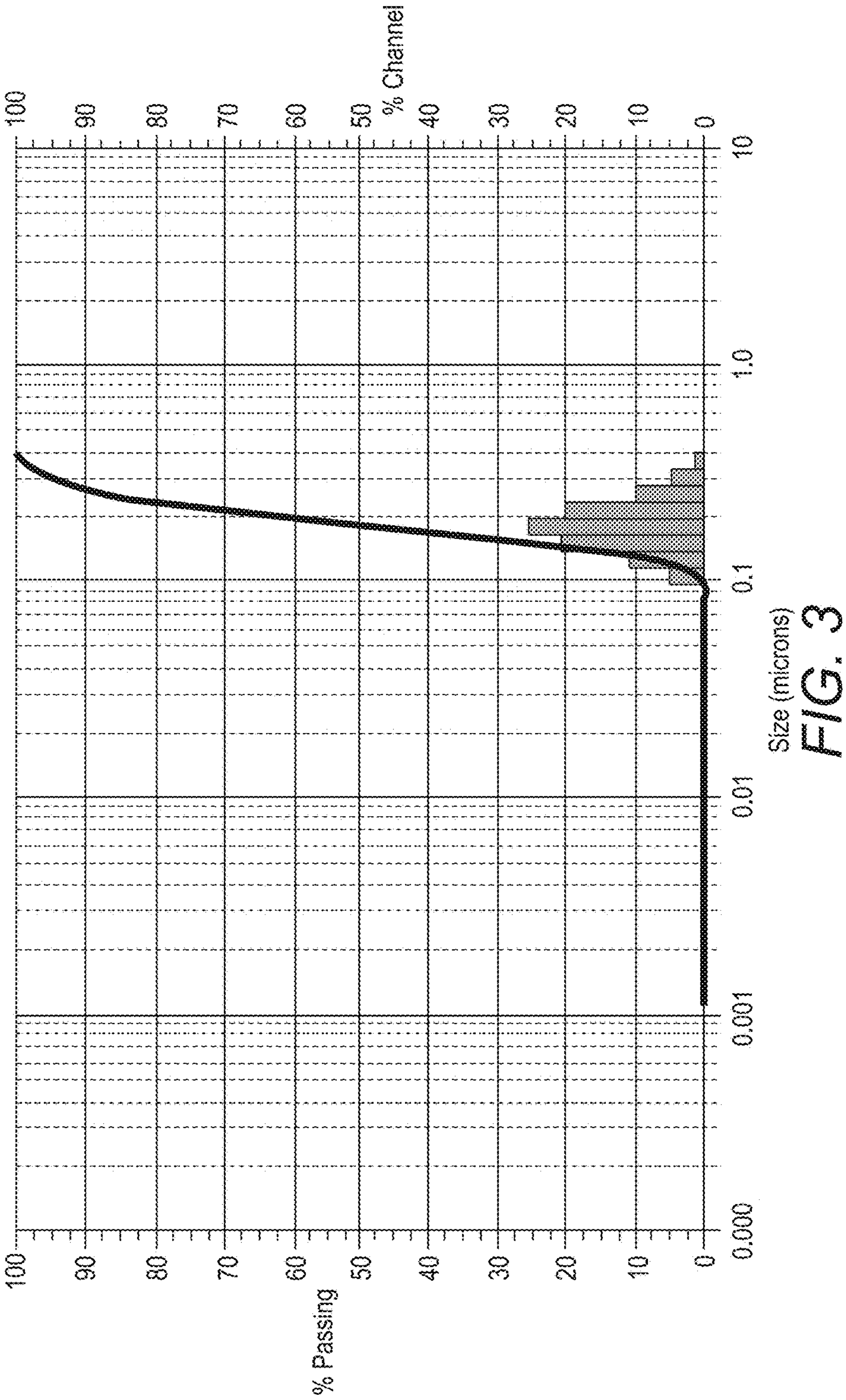
FIG. 3 is a graph depicting the particle size distribution for the latex dispersion composition produced in accordance with Example 2 of the present disclosure.

A 2 Liter Buchi reactor equipped with an agitator was charged with 300 grams of C10C9 crystalline polyester resin, 5.7 grams of triethanolamine (>98%, 1.85 pph), and 14.9 grams of anionic surfactant (TAYCAPOWDER BN2060, 60.4 wt %, 3.0 pph). The reactor was sealed and heated to 100° C. with a mixing speed of 500 RPM and maintained at 100° C. for 10 minutes. 709 grams of DIW was pumped into the mixture at an addition rate of 11.4 grams per minutes in 62 minutes. The emulsion obtained had a particle size of 185 nm (FIG. 3) with a solid content of 31.15%.

Example 3

Figure 4:
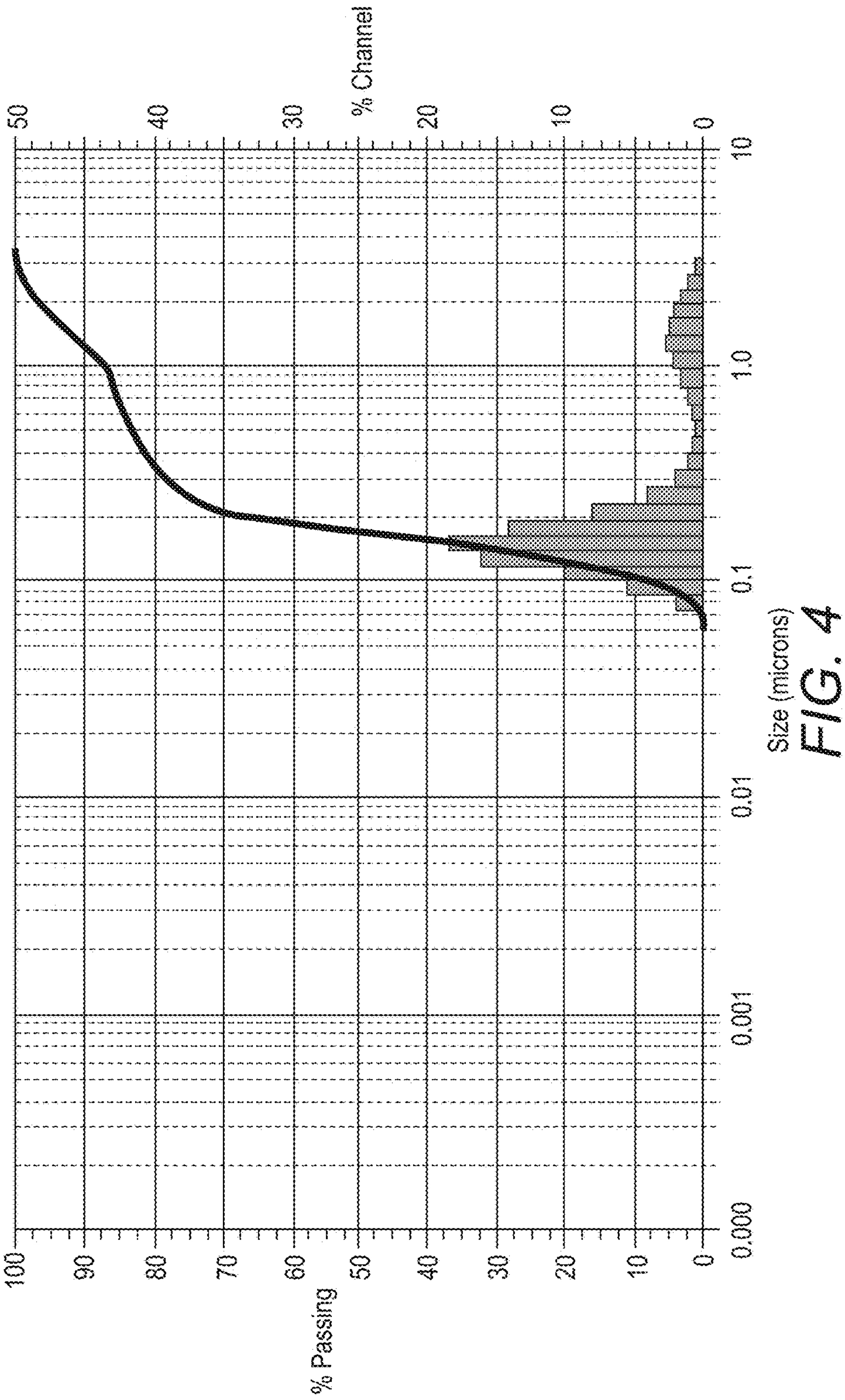
FIG. 4 is a graph depicting the particle size distribution for the latex dispersion composition produced in accordance with Example 3 of the present disclosure.

A 1 gallon reactor was charged with CPE C10:C9 (730 g), 5% ammonia solution (137.2 g), 60% Tayca solution (30.4 g), and DIW (2102 g), and then heated to 120° C. while mixing at 500 rpm. After holding at 120° C. for 10 minutes to allow the resin to melt, the material was run through a Gaulin 15 MR 1 gallon homogenizer at 6000 PSI for 20 minutes. The resulting latex was cooled and discharged through a 100 μm pore-sized bag. The latex showed a bimodal distribution (83% at 155 nm, and 17% at 1333 nm) (see FIG. 4.). This latex was incorporated into a toner, which was tested for charging/blocking.

Example 4

Figure 5:
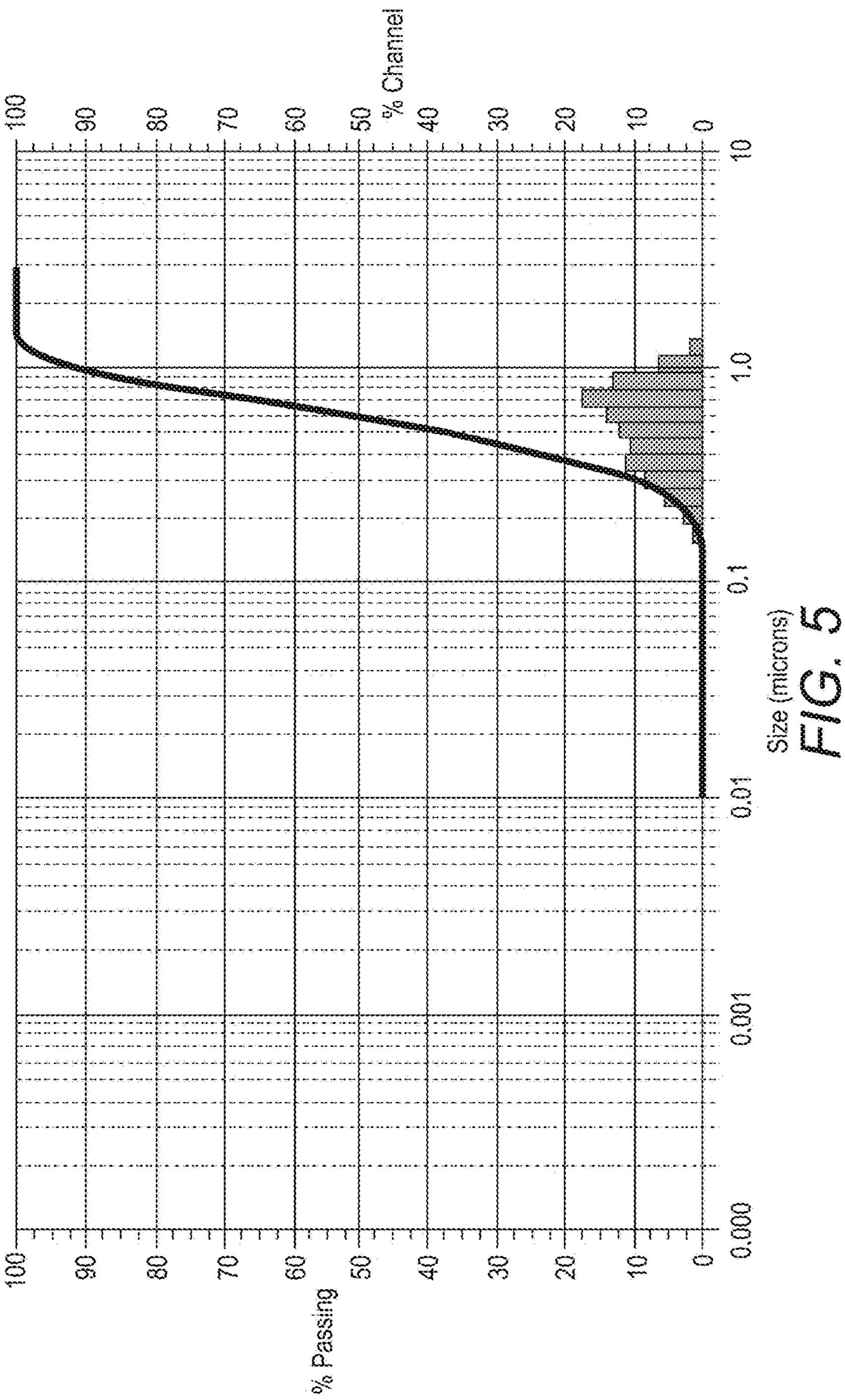
FIG. 5 is a graph depicting the particle size distribution for the latex dispersion composition produced in accordance with Example 4 of the present disclosure.

A 1 gallon reactor was charged with CPE C10:C9 (730 g), 98% Triethanolamine (25.7 g), 60% TAYCAPOWDER BN2060 (36.3 g), and DIW (1714.4 g), and heated to 120° C. while mixing at 500 rpm. After holding at 120° C. for 10 minutes to allow the resin to melt, the material was run through a Gaulin 15 MR 1 gallon homogenizer at 6000 PSI for 40 minutes. The resulting latex was cooled and discharged through a 100 μm pore-sized bag. The resulting latex showed a bimodal distribution (36% at 345 nm and 64% at 721 nm) (see FIG. 5).

Example 5

Residual triethanolamine was removed from the resulting latex of Example 4 through dialysis. The resulting latex of Example 4 was placed into a dialysis membrane and underwent 24 hours of dialysis. A comparison of NMR data taken before dialysis and after indicate removal of triethanolamine (TEA) from the sample latex. A comparison of ion exchange chromatography data performed before dialysis and after indicate removal of TEA from the sample latex.

While the embodiments have been illustrated respect to one or more implementations, alterations and/or modifications can be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments will be apparent to those skilled in the art from consideration of the specification and practice of the descriptions disclosed herein. It is intended that the specification and examples be considered as exemplary only, with a true scope and spirit of the embodiments being indicated by the following claims.

What is claimed is:

1. A process for forming a resin emulsion, comprising:
homogenizing a mixture with a homogenizer, wherein the mixture comprises
water,
a surfactant,
a resin comprising an acidic moiety, and
an organic compound comprising
at least two different moieties, each of the two moieties having a single functionality or dual functionality,
wherein the single functionality and the dual functionality are selected from the group consisting of a capability to neutralize the acidic moiety of the resin and a capability to form a hydrogen bond,
wherein the homogenizing forms an emulsion comprising
a continuous phase comprising the water and
a disperse phase comprising a plurality of droplets comprising the resin,
and
wherein the mixture is not subjected to a phase inversion prior to the formation of the emulsion.

2. The process of claim 1, wherein the mixture and the emulsion are free of an organic solvent.

3. The process of claim 1, further comprising melt mixing the mixture prior to the homogenizing to form a melt composition.

4. The process of claim 3, wherein the melt composition comprises a surfactant level of from about 2.5 pph to about 3 pph based on an amount of resin.

5. The process of claim 3, wherein the melt mixing is conducted in the absence of an organic solvent.

6. The process of claim 1, wherein the wherein the organic compound comprises triethanolamine, ammonia sodium hydroxide or mixtures thereof.

7. The process of claim 1, wherein the melt mixing of the resin occurs at a temperature of from about 120° C. to about 130° C.

8. The process of claim 1, further comprising drying the plurality of droplets to form resin particles, wherein a size of the resin particles comprise a bimodal particle size distribution comprising average particle sizes in a range of from about 160 nm to about 2 μm.

9. The process of claim 1, wherein the emulsion further comprises the surfactant and wherein the process further comprises at least partially removing the surfactant from the emulsion.

* * * * *